United States Patent [19]
Cano et al.

[11] Patent Number: 5,611,969
[45] Date of Patent: Mar. 18, 1997

[54] OPTICAL LENS MOLD AND METHOD OF MAKING THE MOLD

[75] Inventors: Jean-Paul Cano, Sucy-en-Brie; Jean-François Magne, Creteil; Georges Wajs, Ivry, all of France

[73] Assignee: Essilor International, Compagnie Generale d'Optique, Charenton le Pont, France

[21] Appl. No.: 401,457

[22] Filed: Mar. 9, 1995

[30] Foreign Application Priority Data

Mar. 29, 1994 [FR] France ................................. 94 03655

[51] Int. Cl.$^6$ .................................................. B29D 11/00
[52] U.S. Cl. .................. 264/2.5; 264/2.2; 264/219; 264/230; 425/808; 249/82; 249/155
[58] Field of Search ............................. 425/808; 264/219, 264/2.5, 2.2, 1.1, 2.3, 230; 249/82, 155, 52, 105

[56] References Cited

U.S. PATENT DOCUMENTS

| | | | |
|---|---|---|---|
| 3,240,854 | 3/1966 | Ewer | 264/2.2 |
| 3,297,392 | 1/1967 | Ballmer | 264/230 |
| 3,417,177 | 12/1968 | Simons et al. | 264/230 |
| 3,568,311 | 3/1971 | Lawton . | |
| 4,356,046 | 10/1982 | Yamazaki et al. | 264/230 |
| 4,366,201 | 12/1982 | Changani et al. | 264/230 |
| 4,497,754 | 2/1985 | Padoan | 264/2.2 |
| 4,693,446 | 9/1987 | Orlosky | 264/2.2 |
| 4,919,850 | 4/1990 | Blum et al. | 264/2.2 |
| 5,178,801 | 1/1993 | Shimizu et al. . | |
| 5,547,618 | 8/1996 | Magne | 264/2.5 |

FOREIGN PATENT DOCUMENTS

| | | | |
|---|---|---|---|
| 973216 | 2/1951 | France . | |
| 1018486 | 1/1953 | France . | |
| 2667819 | 4/1992 | France . | |
| 2-18021 | 1/1990 | Japan | 264/2.2 |

*Primary Examiner*—Mathieu D. Vargot
*Attorney, Agent, or Firm*—Young & Thompson

[57] ABSTRACT

In this method of making a mold for molding an optical lens an annular closure sleeve is fitted around two molding shells and cooperates with them to define the required molding cavity. The closure sleeve is made from a heat shrinkable synthetic material and is heated to shrink it onto the molding shells. Applications of the method include molds for molding ophthalmic lenses.

15 Claims, 2 Drawing Sheets

OPTICAL LENS MOLD AND METHOD OF MAKING THE MOLD

BACKGROUND OF THE INVENTION

1. Field of the invention

The present invention is generally concerned with the manufacture of molds for making optical lenses from thermosetting synthetic materials.

It is more particularly (but not exclusively) concerned with molds for ophthalmic lenses.

2. Description of the prior art

Such molds comprise two molding shells whose facing inside surfaces are a negative image of the surfaces required on the optical lens to be molded.

To set the distance between the molding shells and to seal the molding cavity delimited by them an annular closure member is required between the molding shells. It must allow the molding shells to follow the shrinkage of the molded thermosetting material as it sets.

At present this closure member is usually a relatively thick gasket in which the molding shells are nested.

Although it can be satisfactory, the use of a gasket imposes a number of constraints, mainly because it must be made in advance, making it require an injection press that represents a not inconsiderable investment, a whole range of different gaskets catering for different geometrical characteristics is needed to cater for various possible conditions of use and a large and therefore costly stock of gaskets must be kept.

Furthermore, the gasket does not of itself locate the molding shells relative to each other, in that it only secures them in one direction.

To secure the molding shells in the opposite direction it is usually necessary to provide a clamp which surrounds them from the outside.

This complicates use of the system.

Finally, the gasket is relatively rigid in itself, which makes handling difficult, and gives rise to recycling problems.

An early proposal to overcome these drawbacks was to make the closure member on demand, and in practise at the last minute, from an annular closure sleeve which is fitted around the two molding shells after they are appropriately located relative to each other.

To be more precise, it was proposed that this closure sleeve should be made by winding a strip material around the edge of the molding shells.

French patent No 973 216 describes the use of a strip of paper, for example, while French patent No 1 018 486 describes the use of a strip of rubber.

In either case, this has the advantage that all that needs to be stored is a roll of the strip.

The strip is simply cut to length as required for use.

Nevertheless, there remains the problem of fastening the closure sleeve to the molding shells it surrounds to locate the two molding shells correctly relative to each other.

French patent No 973 216 proposes to achieve this by gluing.

However, subsequent separation of the molding shells from the closure sleeve to remove the finished optical lens from the mold is then difficult and leaves traces of glue on the molding shells and on the finished lens. These traces of glue must be removed from the molding shells at least, entailing the use of a specific cleaning procedure.

In French patent No 1 018 486 the required fastening is achieved by binding the closure sleeve onto the molding shells but this complicates assembly and separation of the molding shells.

A more recent proposal, for example in published Japanese patent application-No 55-105519, is to make the closure sleeve from adhesive tape.

Apart from the fact that if adhesive tape is used traces of glue remain on the molding shells after the latter are separated and have to be removed, if the adhesive tape has a width less than the overall height of the molding shells, this can reduce its grip on them to the detriment of securing them, or if its width is greater than their height, the excess width of the adhesive tape (i.e. the width of the adhesive tape projecting beyond one or both of the molding shells) must be removed for reasons of cleanliness (as otherwise the surplus adhesive tape could retain dust and other soiling substances).

A general object of the present invention is an arrangement avoiding all these drawbacks.

SUMMARY OF THE INVENTION

In one aspect, the invention consists in a method of making a mold for molding an optical lens in which an annular closure sleeve is fitted around two molding shells and cooperates with them to define the required molding cavity and said closure sleeve is made from a heat shrinkable synthetic material and is heated to shrink it onto said molding shells; it further consists in a mold made in this way and an optical lens molded using this mold.

In accordance with the invention, the closure sleeve is made from a heat-shrink synthetic material, and is either formed in situ by winding a strip around the edge of the molding shells or constitutes a preformed closure sleeve, i.e. a closure sleeve made in advance from a section of tube.

In either case, after shrinking, the closure sleeve comprises a re-entrant area between the molding shells which is more or less accentuated depending on the process employed but which is in any event sufficient to secure the molding shells in one direction; it also forms a continuous lip at each end which is pressed onto the outside surface of the molding shells and which therefore secures them in the opposite direction.

The molding shells are therefore firmly located relative to each other, with all the necessary stiffness, by the closure sleeve around them. This has the advantage that the mold of the invention can be handled after it is made if any such handling is needed between making the mold and subsequently molding the optical lens.

Also, the molding shells are easy to separate after molding, without using any special tools, and without leaving any traces on the molding shells.

The features and advantages of the invention will emerge from the following description given by way of example and with reference to the appended diagrammatic drawings.

DETAILED DESCRIPTION OF THE PREFERRED EMBODIMENTS

FIGS. 1 through 5 show by way of example the application of the invention to making a mold 10 for molding a concave and therefore divergent optical lens (not shown).

In the known way the mold 10 essentially comprises two molding shells 10A, 10B, with substantially the same thickness and substantially the same circular contour.

The two molding shells 10A, 10B are disposed coaxially one above the other with their facing inside surfaces 11A, 11B each corresponding to a respective required surface of the optical lens to be made.

For example, the molding shells 10A, 10B are made of glass and their outside surfaces 12A, 12B are generally spherical, in the usual way.

Their edges 13A, 13B are generally cylindrical.

In the known way an annular closure sleeve 14 is formed around the two molding shells 10A, 10B. It cooperates with them to define the molding cavity 15. In addition to this function it locates the molding shells 10A, 10B relative to each other.

In accordance with the invention, the closure sleeve 14 is made from a heat shrinkable synthetic material and is heated to shrink it onto the molding shells 10A, 10B.

The heat shrinkable synthetic material is polyvinylchloride or a polyester such as polybutyleneteraphtalate, for example.

It is chosen to avoid any interference with (for example migration into) the thermosetting molding material.

In the embodiment shown in FIGS. 1 through 5 the closure sleeve 14 is formed in situ by winding a strip 16 onto the edges 13A, 13B of the molding shells 10A, 10B.

The thickness of the strip 16 and consequently that of the closure sleeve 14 formed from it can be between 20 microns and 200 microns, for example.

In practise this thickness depends on the heat shrinkable synthetic material used and is chosen so that the mold 10 obtained has the necessary rigidity.

For reasons that emerge below, the width of the strip 16 and consequently the height H1 of the closure sleeve 14 is preferably greater than the overall height H2 of the molding shells 10A, 10B as measured at the periphery of their outside surfaces 12A, 12B. Accordingly, at the outset the closure sleeve 14 extends axially beyond at least one of the molding shells 10A, 10B.

In the embodiment shown the closure sleeve 14 initially extends axially beyond both sides of the molding shells 10A, 10B, projecting beyond the outside surface 12A of the molding shell 10A and beyond the outside surface 12B of the molding shell 10B, at their periphery.

Naturally, while forming the closure sleeve 14 it is necessary to locate the molding shells 10A, 10B relative to each other, at least temporarily.

Figure 1:
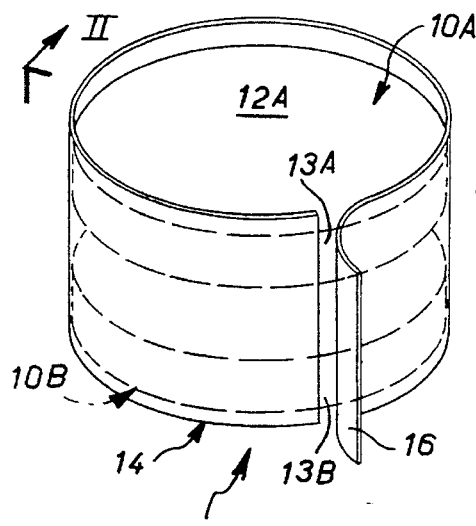
FIG. 1 is a perspective view of one phase of the method in accordance with the invention for making a mold.
Figure 2:
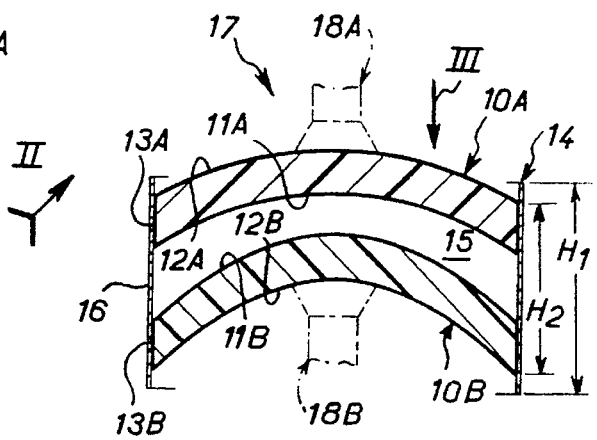
FIG. 2 is a view in section on the line II—II in FIG. 1 during this phase of the method.

As shown in chain-dotted line in FIG. 2, at least one of the molding shells 10A, 10B (both of them in practise) is held by a holding member 18A, 18B releasably attached to the central area of their outside surface 12A, 12B.

The holding members 18A, 18B are suckers, for example.

After winding the strip 16 around the edges 13A, 13B of the molding shells 10A, 10B the two ends of the strip 16 are fastened together to close the molding cavity 15.

These two ends are locally welded, for example, by applying a heated blade (not shown) to the strip 16 perpendicularly to the edges 13A, 13B of the molding shells 10A, 10B.

Figure 3:
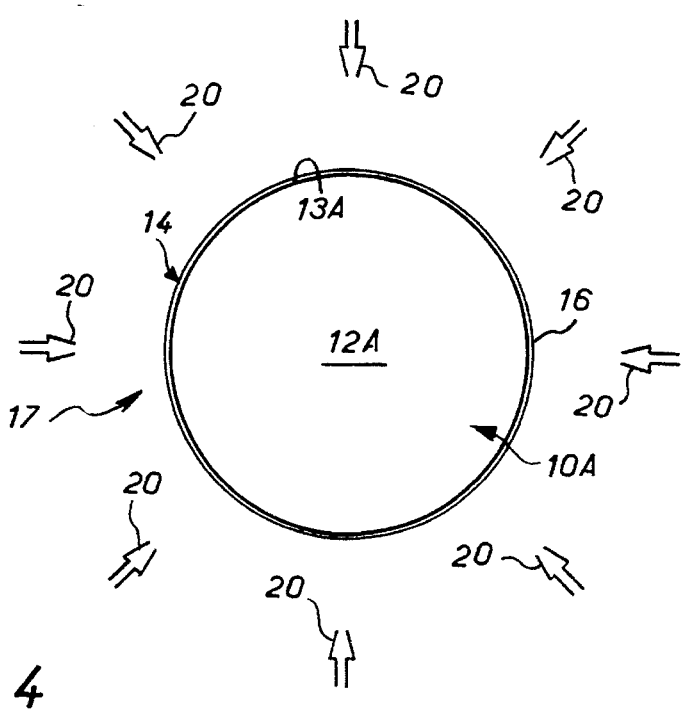
FIG. 3 is a view in the direction of the arrow III in FIG. 2 showing a later phase of the method of the invention.
Figure 4:
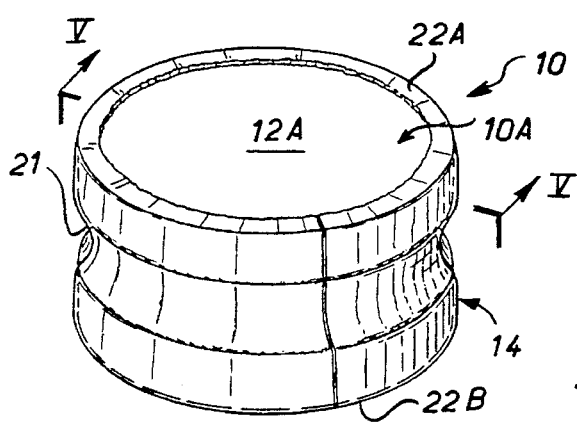
FIG. 4 is a perspective view of the mold obtained by the method of the invention.
Figure 5:
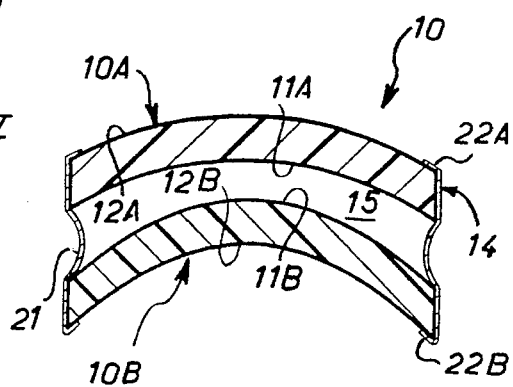
FIG. 5 is a view of this mold in axial section on the line V—V in FIG. 4.

The heating operation which is then required to shrink the resulting closure sleeve 14 onto the molding shells 10A, 10B can use a plurality of nozzles 20, for example, as shown in FIG. 3, distributed circumferentially around the corresponding subassembly 17 and directed radially towards the subassembly 17 to blow a hot fluid (in practise air) onto it.

This shrinks the closure sleeve 14.

The sleeve then has a more or less accentuated annular re-entrant area 21 between the molding shells 10A, 10B. Conjointly, it forms at each end a continuous rim 22A, 22B pressed against the outside surfaces 12A, 12B of the molding shells 10A, 10B.

The molding shells 10A, 10B are therefore secured by the closure sleeve 14 both on their inside surfaces 11A, 11B and on their outside surfaces 12A, 12B.

Given the rigidity of the assembly, the molding shells 10A, 10B can with advantage be relatively thin, having a thickness in the order of 2 mm, for example.

In the embodiment shown, which is particularly suitable for molding concave lenses as they have a relatively thick peripheral edge which means that the distance between the edges of the molding shells 10A, 10B is relatively large, the re-entrant area 21 formed by the closure sleeve 14 has a circular arc profile in transverse section and is not particularly accentuated.

It is nevertheless sufficient.

It can be more accentuated, if necessary, as described in more detail below in connection with the molding of convex lenses.

The molding material is introduced into the molding cavity 15 in the usual way through a hole made for this purpose in the re-entrant area 21 of the closure sleeve 14.

This hole is then closed with a piece of adhesive tape, for example.

Tests have shown that the sealing of the mold 10 by the closure member 14 in accordance with the invention is sufficient to retain the molding material even if the mold 10 is not filled until some time after it is made.

The molding material can be polymerized in the usual way by heat or by radiation, for example by UV light.

To separate the two molding shells 10A, 10B all that is required is to tear off the closure sleeve 14.

The closure sleeve 14 advantageously leaves no traces either on the molding shells 10A, 10B or on the optical lens.

All the above operations can be carried out manually.

They can equally well be carried out mechanically, on a machine.

Figure 6:
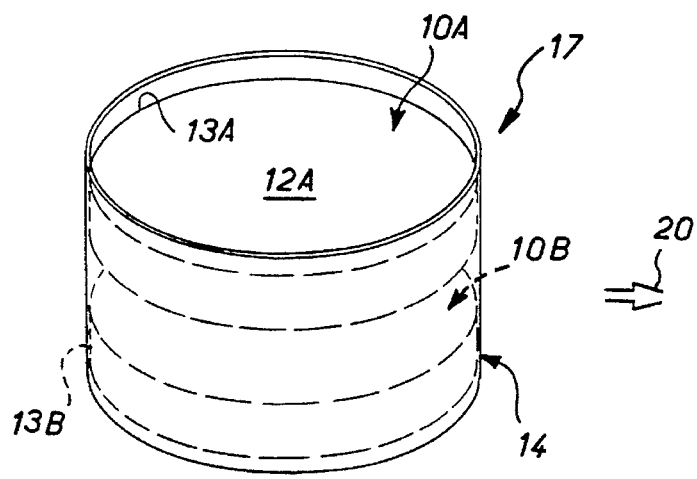
FIG. 6 is a perspective view analogous to that of FIG. 1 for an alternative embodiment of the invention.

In the embodiment shown in FIG. 6 the closure sleeve 14 is made in advance from a section of tube which is slipped over the molding shells 10A, 10B.

In other words, in this case the closure sleeve 14 is a section of tube from the outset, cut to the required height.

Figure 7:
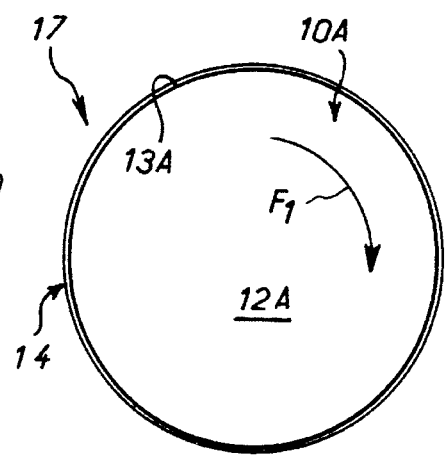
FIG. 7 is a view analogous to that of FIG. 3 for an alternative embodiment of the invention.

In the embodiment shown in FIG. 7 the heating operation is carried out using a single nozzle 20.

The subassembly 17 formed by the molding shells 10A, 10B and the closure sleeve 14 is rotated about its axis in front of the nozzle 20, as shown by the arrow F1 in FIG. 7.

Figure 8:
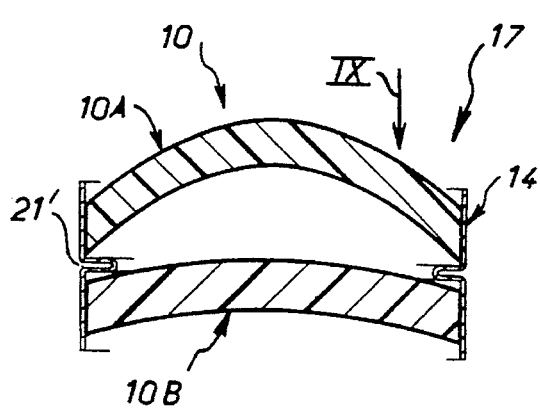
FIG. 8 is a view in axial section analogous to that of FIG. 2 for an alternative embodiment of the invention.
Figure 10:
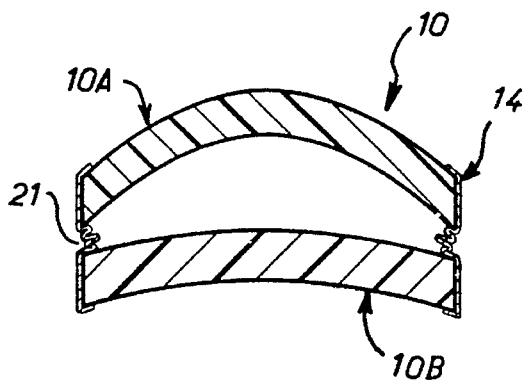
FIG. 10 is a view in axial section analogous to that of FIG. 8 of the mold made by this method.
Figure 9:
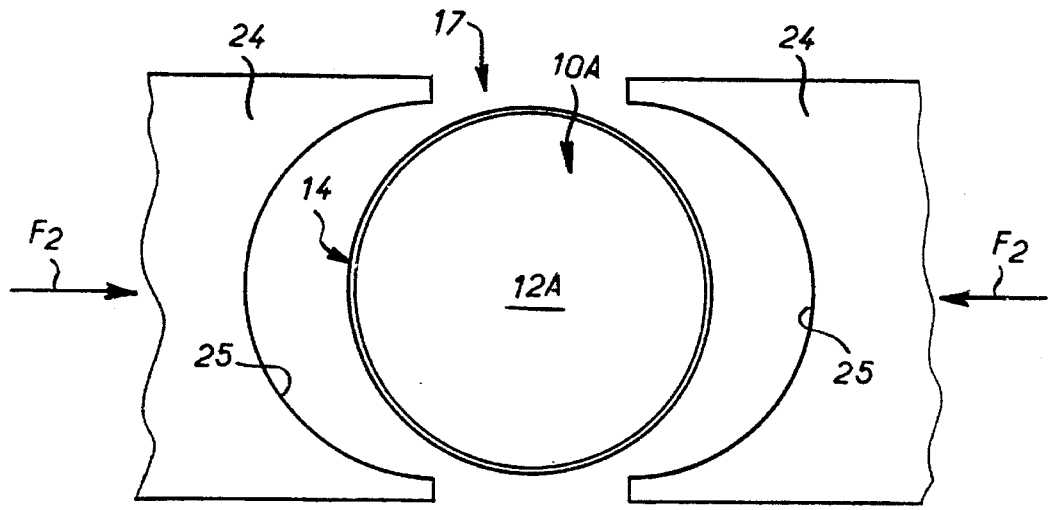
FIG. 9 is a view in the direction of the arrow IX in FIG. 8 relating to one phase of the method constituting this embodiment of the invention.

FIGS. 8 through 10 relate to an alternative embodiment of the method of the invention used when the optical lens to be made is a convex, i.e. convergent lens, for example.

In this case the edges of the molding shells 10A, 10B are relatively close together and it may be preferable to precede the heating operation with a forming operation whereby the closure sleeve 14 forms in advance an annular re-entrant area 21' between the molding shells 10A, 10B.

In the embodiment shown this re-entrant area 21' forms a transverse U-shape fold in the closure sleeve 14.

As shown in FIG. 9, for example, the re-entrant area 21' is obtained by surrounding the closure sleeve 14 with two heating blades 24 each of which has a semicircular leading edge 25 and which are moved towards each other in the direction of the arrows F2 in FIG. 9.

After the closure sleeve 14 is shrunk onto the molding shells 10A, 10B (FIG. 10) the re-entrant area 21 formed in the closure sleeve 14 between the molding shells 10A, 10B is advantageously large enough to hold them, despite the short distance between their peripheries.

This re-entrant area 21 also forms a free space between the molding shells 10A, 10B on the outside of the mold. This facilitates separation of the molding shells 10A, 10B after molding, using a spatula, for example, despite the small distance between their edges.

Of course, the present invention is not limited to the embodiments described and shown but encompasses any variant execution and/or combination of their various component parts.

In particular, if a strip is used to form the closure member of the invention, more than one turn of the strip can be wound on, if necessary.

There is claimed:

1. A method of making a mold for molding an optical lens, said method comprising the steps of a providing two molding shells and an annular closure sleeve member of heat shrinkable material, applying the closure sleeve around peripheral edges of the molding shells, and then heat shrinking the closure sleeve around the molding shells to locate the molding shells and firmly hold them relative to the closure sleeve non adhesive whereby there results a mold for molding an optical lens.

2. A method according to claim 1, wherein the closure sleeve initially extends axially beyond at least one of the molding shells.

3. A method according to claim 1, wherein the closure sleeve initially extends axially beyond both of the molding shells.

4. A method according to claim 1, wherein before applying heat to heat shrink the closure sleeve around the molding shells, an annular re-entrant area is formed in the closure sleeve between the molding shells.

5. A method according to claim 4, wherein said annular re-entrant area has a U-shaped bend or fold therein.

6. A method according to claim 1, wherein at least one of the molding shells is releasably held in position in a central area of an outside surface thereof while applying the closure sleeve.

7. A method according to claim 1, wherein the closure sleeve is initially applied to the molding shells in situ by winding a strip of heat shrinkable material along the peripheral edges of the molding shells.

8. A method according to claim 7, wherein opposed edges of the strip are fastened together after the strip is wound around the molding shells.

9. A method according to claim 1, wherein the sleeve initially comprises a section of a tube of heating shrinkable material.

10. A method according to claim 2, wherein after heating shrinking of the closure sleeve, a portion initially extending beyond the at least one molding shell bears against an outer annular surface of said at least one molding shell.

11. A method according to claim 3, wherein after heat shrinking of the closure sleeve, portions initially extending beyond the at least one molding shell bear against outer annular surfaces of said molding shell.

12. A method according to claim 1, wherein the heat shrinkable material is nonadhesive.

13. A mold for molding an optical lens, comprising two molding shells disposed in general axial alignment and axially spaced position relative to each other, and a heat shrunk closure sleeve member applied to peripheral edges of said molding shells, whereby said closure sleeve locates the molding shells and holds them firmly.

14. A mold according to claim 12, wherein said sleeve has radially inwardly extending annular rim at least at one end, said rim bearing against an outer annular surface of the respective one of said molding shells.

15. A mold according to claim 13, wherein said sleeve has an annular re-entrant area extending radially inwardly of the peripheral edges of the molding shells and between said molding shells.

* * * * *